United States Patent
Park et al.

(10) Patent No.: US 11,640,493 B1
(45) Date of Patent: May 2, 2023

(54) METHOD FOR DIALOGUE SUMMARIZATION WITH WORD GRAPHS

(71) Applicant: ActionPower Corp., Seoul (KR)

(72) Inventors: Seongmin Park, Seoul (KR); Jihwa Lee, Seoul (KR)

(73) Assignee: ActionPower Corp., Seoul (KR)

(*) Notice: Subject to any disclaimer, the term of this patent is extended or adjusted under 35 U.S.C. 154(b) by 0 days.

(21) Appl. No.: 17/880,501

(22) Filed: Aug. 3, 2022

(30) Foreign Application Priority Data

Jun. 3, 2022 (KR) ........................ 10-2022-0068319

(51) Int. Cl.
*G06F 40/10* (2020.01)
*G06F 40/166* (2020.01)
*G06F 40/284* (2020.01)
*G06F 16/332* (2019.01)
*G06F 16/901* (2019.01)

(52) U.S. Cl.
CPC ........ *G06F 40/166* (2020.01); *G06F 16/3329* (2019.01); *G06F 16/9024* (2019.01); *G06F 40/284* (2020.01)

(58) Field of Classification Search
None
See application file for complete search history.

(56) References Cited

U.S. PATENT DOCUMENTS

| | | | |
|---|---|---|---|
| 9,390,087 B1 * | 7/2016 | Roux | G06F 40/56 |
| 11,132,988 B1 * | 9/2021 | Steedman Henderson | G10L 15/22 |
| 11,232,235 B2 * | 1/2022 | Hadar | G06F 21/577 |
| 2005/0033574 A1 * | 2/2005 | Kim | G10L 15/22 |
| | | | 704/E15.04 |
| 2020/0152184 A1 * | 5/2020 | Steedman Henderson | G10L 15/1822 |
| 2020/0265044 A1 * | 8/2020 | Yamane | G06Q 10/047 |
| 2021/0042298 A1 * | 2/2021 | Yamane | G06F 16/9024 |

FOREIGN PATENT DOCUMENTS

| | | |
|---|---|---|
| KR | 10-2196583 B1 | 12/2020 |
| KR | 10-2296931 B1 | 9/2021 |
| KR | 10-2021-0134878 A | 11/2021 |
| KR | 10-2334236 B1 | 12/2021 |

OTHER PUBLICATIONS

Tixier et al., "Combining Graph Degeneracy and Submodularity for Unsupervised Extractive Summarization," Data Science and Mining Team (DaSciM), École Polytechnique, Palaiseau, France, pp. 1-48.
(Continued)

*Primary Examiner* — Maikhanh Nguyen
(74) *Attorney, Agent, or Firm* — Seed IP Law Group LLP

(57) ABSTRACT

Disclosed is a method for dialogued summarization with word graphs, which is performed by one or more processors of a computing device. The method may include: generating a word graph based on information on a dialogue which is a summary target; extracting at least one keyword based on the generated word graph; generating a plurality of candidate summary sentences based on the generated word graph; and calculating a score associated with at least one keyword for each of the plurality of candidate summary sentences, and selecting at least one of the plurality of candidate summary sentences based on the calculated score.

9 Claims, 7 Drawing Sheets

(56) References Cited

OTHER PUBLICATIONS

Gliwa et al., "SAMSum Corpus: A Human-annotated Dialogue Dataset for Abstractive Summarization," Samsung R&D Institute Poland, pp. 1-10, Nov. 29, 2019.
Lee et al., "Document Summarization Based on Sentence Clustering Using Graph Division."
Park et al, "Unsupervised Abstractive Dialogue Summarization with Word Graphs and POV Conversion," ActionPower, Seoul, Republic of Korea.
Tixier et al., "Combining Graph Degeneracy and Submodularity for Unsupervised Extractive Summarization," Data Science and Mining Team (DaSciM), École Polytechnique, Palaiseau, France, pp. 48-58, Sep. 7, 2017.
Lee et al., "Document Summarization Based on Sentence Clustering Using Graph Division," Apr. 2006.

\* cited by examiner

METHOD FOR DIALOGUE SUMMARIZATION WITH WORD GRAPHS

CROSS-REFERENCE TO RELATED APPLICATION(S)

This application claims priority to and the benefit of Korean Patent Application No. 10-2022-0068319 filed in the Korean Intellectual Property Office on Jun. 3, 2022, the entire contents of which are incorporated herein by reference.

BACKGROUND

Technical Field

The present disclosure relates to a method for dialogue summarization with word graphs, and more particularly, to a method for extracting a summary sentence in word graphs generated based on a dialogue.

Description of the Related Art

A summarization architecture trained by the existing supervised learning has a problem that could not be used in domains without learning data.

In an existing word graph based summarization system, an external system is required in choosing a key word. For example, word importance discrimination algorithms are required such as WordNet and TF-IDF, and when a sentence is extracted from word graphs, an additional task such as submodularity maximization or entailment labeling is required.

The existing dialogue summarization systems do not directly use speaker information for a final summary.

BRIEF SUMMARY

The inventors of the present disclosure appreciate that in the dialogue summarization, the speaker information is important in a context unlike existing text summarization. However, the existing dialogue systems in the related art only indirectly use the speaker information melted in speaking.

Further, in the existing dialogue summarization system, the external system is required in order to summarize a long text.

One or more embodiments of the present disclosure provide a new summarization technique capable of solving the technical problems or disadvantages in the related art.

One or more embodiments of the present disclosure provide solution to one or more problems in the related art including the one identified above.

The present disclosure provides a method for extracting a summary sentence from word graphs generated based on a dialogue.

An embodiment of the present disclosure provides a method performed by a computing device. The method may include: generating a word graph based on information on a dialogue which is a summary target; extracting at least one keyword based on the generated word graph; generating a plurality of candidate summary sentences based on the generated word graph; and calculating a score associated with at least one keyword for each of the plurality of candidate summary sentences, and selecting at least one of the plurality of candidate summary sentences based on the calculated score.

Alternatively, the generating of the word graph may include segmenting the information on the dialogue by the unit of a token, adding an additional token indicating a start and an end to a front and a rear of each sentence, and adding each token to a node according to an order.

Alternatively, the generating of the plurality of candidate summary sentences based on the generated word graph may include extracting a plurality of paths connected to the node indicating the end of each sentence from the node indicating the start of each sentence from the word graph, and generating the plurality of candidate summary sentences based on the plurality of extracted paths.

Alternatively, the generating of the plurality of candidate summary sentences based on the plurality of extracted paths may include generating the plurality of candidate summary sentences by applying a k-shortest path algorithm to the plurality of extracted paths.

Alternatively, the extracting of at least one keyword based on the generated word graph may include determining at least one k-core node in the word graph, and extracting at least one keyword based on at least one determined node.

Alternatively, the score may be calculated for each of the plurality of candidate summary sentences, and a score for a specific candidate summary sentence may be calculated based on a node set of all nodes which belongs to a path of the specific candidate summary sentence and a keyword set of all keywords related to the dialogue.

Alternatively, the score for the specific candidate summary sentence may be calculated based on a size of an intersection of the node set for the specific candidate summary sentence and the keyword set, and the size of the keyword set.

Alternatively, the method performed by the computing device may further include converting a grammatical person for at least one selected candidate summary sentence.

Alternatively, the converting of the grammatical person for at least one selected candidate summary sentence may include converting a first person or second persons expression of at least one selected candidate summary sentence into a third person expression.

Alternatively, the generating of the plurality of candidate summary sentences based on the generated word graph may include generating a plurality of word sub-graphs by segmenting the word graph, and generating a plurality of candidate sub-summary sentences for each of the plurality of word sub-graphs.

Alternatively, the generating of the plurality of word sub-graphs by segmenting the word graph may include generating a vector representing whether each sentence includes at least one keyword for each of the sentences included in the word graph, and generating the plurality of word sub-graphs based on a distance or a similarity between the generated vectors.

Another embodiment of the present disclosure provides a computer program stored in a non-transitory computer-readable storage medium. The computer program may allow one or more processors to perform operations for generating dialogue summarization when the computer program is executed by the one or more processors and the operations may include: generating a word graph based on information on a dialogue which is a summary target; extracting at least one keyword based on the generated word graph; generating a plurality of candidate summary sentences based on the generated word graph; and calculating a score associated with at least one keyword for each of the plurality of candidate summary sentences, and selecting at least one of the plurality of candidate summary sentences based on the calculated score.

Still another embodiment of the present disclosure provides a computing device. The device may include: at least one processor; and a memory, in which the at least one processor may be configured to generate a word graph based on information on a dialogue which is a summary target, extract at least one keyword based on the generated word graph and generate a plurality of candidate summary sentences based on the generated word graph, and calculate a score associated with at least one keyword for each of the plurality of candidate summary sentences, and select at least one of the plurality of candidate summary sentences based on the calculated score.

According to an embodiment of the present disclosure, a method for dialogued summarization can be provided, and a method for extracting a summary sentence from word graphs generated based on a dialogue can be provided.

Effects which can be obtained in the present disclosure are not limited to the aforementioned effects and other unmentioned effects will be clearly understood by those skilled in the art from the following description.

DETAILED DESCRIPTION

Figure 1:
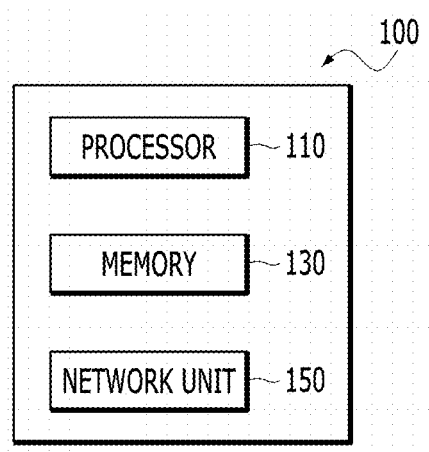
FIG. 1 is a block diagram of a computing device for generating a summary of a dialogue according to an embodiment of the present disclosure.

Various embodiments will now be described with reference to drawings. In the present specification, various descriptions are presented to provide appreciation of the present disclosure. However, it is apparent that the embodiments can be executed without the specific description.

"Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art recognizes that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for generating a summary of a dialogue according to an embodiment of the present disclosure.

A configuration of the computing device 100 illustrated in FIG. 1 is only an example shown through simplification. In an embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an embodiment of the present disclosure. According to an embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an embodiment of the present disclosure, processors of a plurality of computing devices may be used together to process the learning of the network function and the data classification using the network function. Further, the computer program executed in the computing device according to an embodiment of the present disclosure may be a CPU, GPGPU, or TPU executable program.

The processor 110 according to an embodiment of the present disclosure may recognize information on a dialogue to generate a summary of the dialogue, generate a word graph based on the information on the dialogue, and perform operations of extracting at least one keyword from the generated word graph. In this case, the information on the dialogue may be information, a daily life, an interview, a scenario, or discussion summary data.

According to an embodiment of the present disclosure, the processor 110 may generate a plurality of candidate summary sentences based on the generated word graph. Further, the processor 110 may calculate a score associated with at least one keyword for each of the plurality of candidate summary sentences, and perform summarization for the dialogue by selecting at least one of the plurality of candidate summary sentences based on the calculated score.

According to an embodiment of the present disclosure, the memory 130 may store any type of information generated or determined by the processor 110 and any type of information received by the network unit 150.

According to an embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an embodiment of the present disclosure may use an arbitrary type known wired/wireless communication systems.

For example, the network unit 150 may receive the information on the dialogue from the external system. In this case, the information received from the database may be learning data or inference data for extracting the summary sentence by generating the word graph. The information on the dialogue may include the information of the examples, but is not limited to the above-described example, and may be variously constituted within a range which may be appreciated by those skilled in the art.

The network unit 150 may transmit and receive information processed by the processor 110, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150.

Meanwhile, according to an embodiment of the present disclosure, the computing device 100 as a computing system that transmits and receives information to and from the client through communication may include a server. In this case, the client may be any type of terminal which may access the server. For example, the computing device 100 which is the server may generate a summary result for the dialogue by receiving information for extracting the summary sentence by generating the word graph from an external database, and provide the user interface for the summary result for the dialogue to the user terminal. In this case, the user terminal may output the user interface received from the computing device 100 as the server, and receive and process the information through an interaction with the user.

In an additional embodiment, the computing device 100 may also include any type of terminal that performs additional information processing by receiving a data resource generated in any server.

Figure 2:
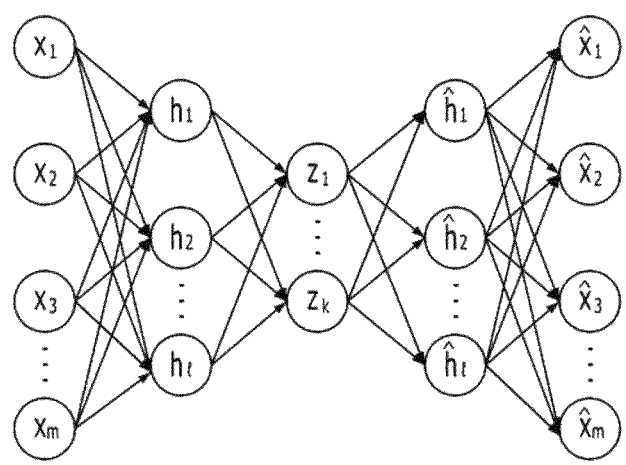
FIG. 2 is a schematic view illustrating a network function according to an embodiment of the present disclosure.

FIG. 2 is a schematic diagram illustrating a network function according to an embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another embodiment of the present disclosure, the number of nodes of the input layer may be larger than the number of nodes of the output layer, and the neural network may be a neural network of a type in which the number of nodes increases from the input layer to the hidden layer. The neural network according to still yet another embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to reduce or minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
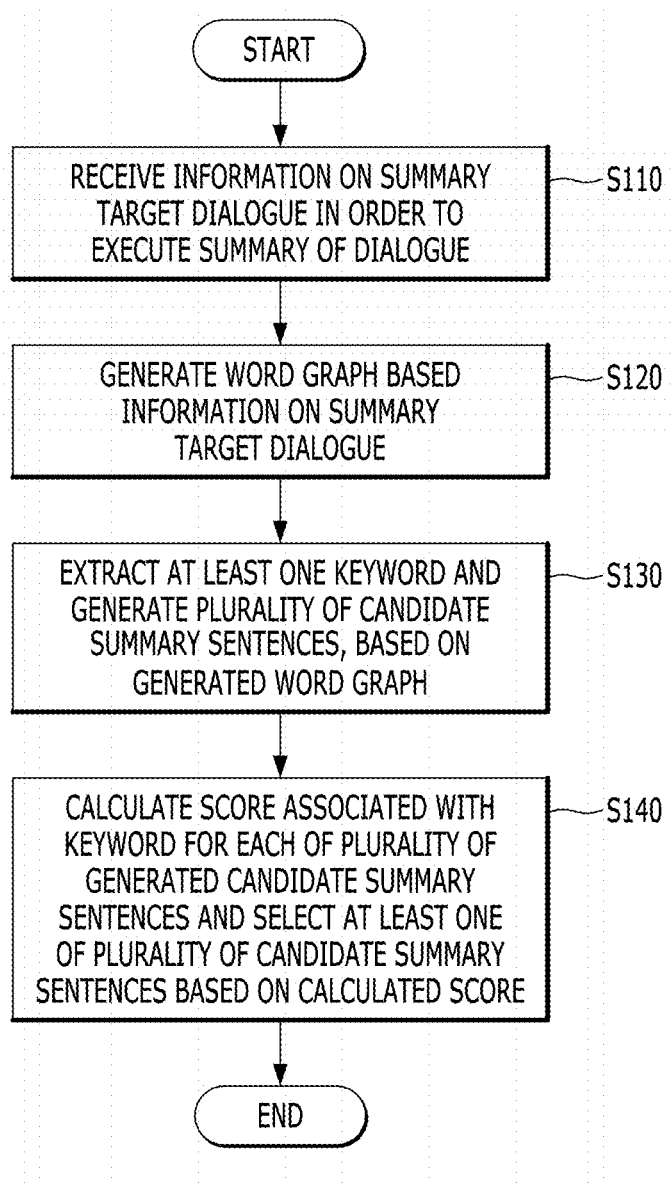
FIG. 3 is a flowchart illustrating a method for extracting a summary sentence from word graphs according to an embodiment of the present disclosure.

FIG. 3 is a flowchart illustrating a method for extracting a summary sentence from word graphs according to an embodiment of the present disclosure.

Referring to FIG. 3, the computing device 100 according to an embodiment of the present disclosure may receive information on a summary target dialogue in order to execute a summary of a dialogue from an external system (S110). The summary target dialogue as a dialogue which becomes a target for which the summary is executed is dialogue which becomes the target of the summary according to an embodiment of the present disclosure. The external system may be a server, a database, etc., which stores and manages the information for the summary of the dialogue. The computing device 100 may use the dialogue information received from the external system as input data for extracting the summary sentence.

The computing device 100 may generate the word graph by expressing words included in the dialogue in the form of a graph based on the information on the summary target dialogue (S120). For example, the computing device 100 may perform a process of converting the information on the summary target dialogue into a text and segmenting the converted text by the unit of the token, and adds each token to a node according to an order to generate the word graph.

The computing device 100 may extract at least one keyword and generate a plurality of candidate summary sentences based on the word graph generated through step S120 (S130).

The computing device 100 may summarize the summary target dialogue by calculating the score associated with the keyword for each of the plurality of candidate summary sentences generated through step S130, and selecting at least one of the plurality of candidate summary sentences based on the calculated score (S140).

Figure 4:
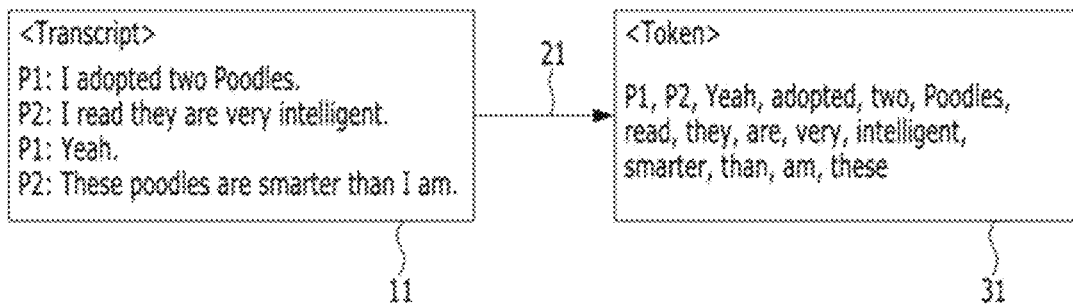
FIG. 4 is a schematic view for describing a step of segmenting information on a dialogue by the unit of a token according to an embodiment of the present disclosure.

FIG. 4 is a schematic view for describing a step of segmenting information on a dialogue by the unit of a token according to an embodiment of the present disclosure.

Referring to FIG. 4, the computing device 100 according to an embodiment of the present disclosure may receive information 11 on the dialogue from the external system in order to generate the word graph.

In this case, the information 11 on the dialogue may include text information on a daily dialogue, text information on the interview, text information on the scenario, text information on discussion summary data, etc., and include various dialogues in addition to the examples. The text information on the dialogue may be acquired through automatic speech recognition (ASR) or speech-to-text (STT). As such, the information on the dialogue may include dialogue information of various domains not limited to a specific domain and requiring the summary.

The computing device 100 may use the information on the dialogue received from the external system as the input data for generating the word graph. For example, the example of FIG. 4 may disclose text information speakers of P1 and P2 have a daily dialogue for poodles, and the embodiments of the present disclosure may be performed in order to summarize the text information of the daily dialogue.

The computing device 100 may perform a process 21 of segmenting information on the received dialogue by the unit of the token. An external word class tagger may be used for the process of segmenting the input text for the dialogue by the unit of the token. Further, when the input text is Korean, the morpheme tagger may be used. For example, a process of tagging the word class to the input text by using the external word class tagger and segmenting the input text by the unit of the token to which the word class is tagged may be performed.

The computing device 100 may acquire the segmented tokens of the input text through the segmentation process 21 (31). For example, as seen in the example of FIG. 3, the computing device 100 may acquire the segmented tokens such as P1, P2, Yeah, adopted, two, Poodles, read, they, are, very, intelligent, smarter, than, am, these, etc., through the segmentation process 21. Here, the segmented tokens may be each of tokens to which the word class or morpheme is tagged according to the external word class tagger or morpheme tagger.

Figure 5:
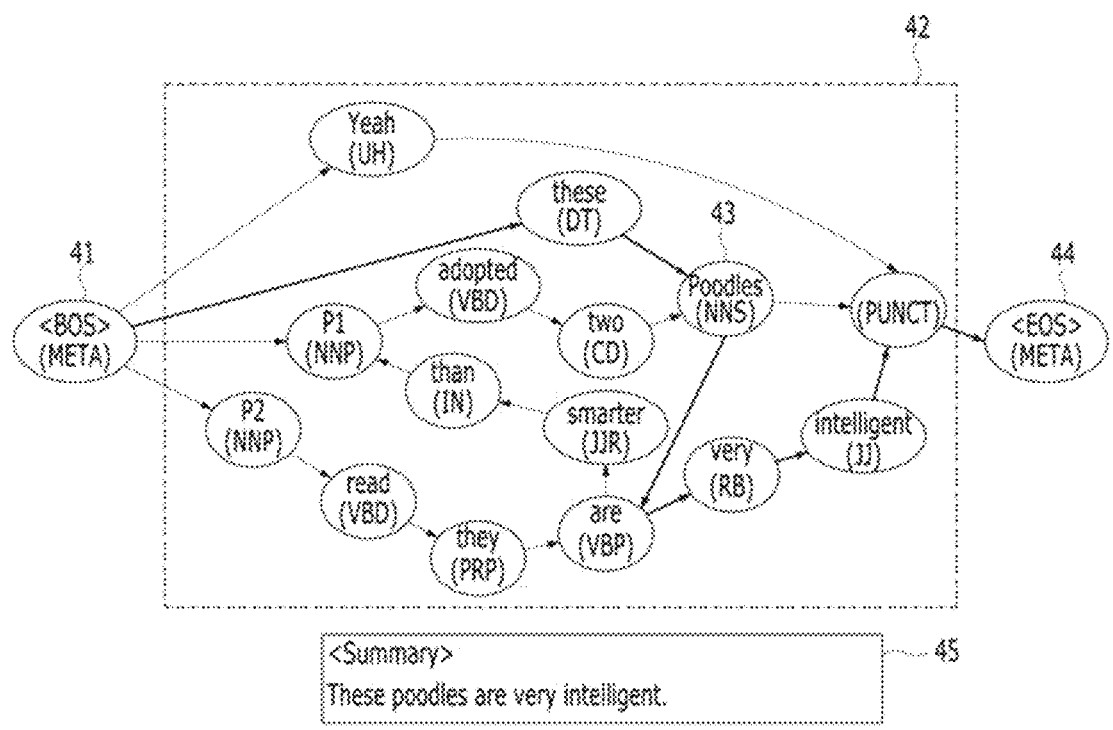
FIG. 5 is a schematic view illustrating a method for generating a summary of a dialogue based on word graphs according to an embodiment of the present disclosure.

FIG. 5 is a schematic view illustrating a method for generating a summary of a dialogue based on word graphs according to an embodiment of the present disclosure.

According to an embodiment of the present disclosure, the computing device may segment sentences included in the input dialogue by the unit of the token. Further, the computing device 100 may add an additional token representing a start and an end to a front and a rear of each sentence input into the word graph. Specifically, the computing device 100 may add a <BOS> token 41 representing the start to the front of each sentence and add an <EOS> token 44 representing the end to the end of each sentence. For example, a sentence of "John eats pizza" may be segmented into tokens of [<BOS>, John, eats, pizza, <EOS>]. Further, the computing device 100 may constitute overlapped tokens as the same node on the word graph. As a result, when all sentences of the input dialogue information are added to the word graph, each of one <BOS> token 41 and one <EOS> token 44 may be present in the word graph. Further, an action 42 of adding each segmented token to the node according to the order by inputting the input text segmented by the unit of the token into the word graph may be performed. In this case, a previous word may include an edge heading to a next word, and the action of adding each segmented token to the node to the word graph according to the order may include a process of adding words in which a tagged word class and a tagged word overlap to the same node. The action 42 of adding each segmented token to the node according to the order as such is performed to generate the word graph for the summary target dialogue. Through the constitution of the word graph, it is possible to quickly extract a sub-graph including only a node related to speaking of the speaker.

According to an embodiment of the present disclosure, the computing device 100 may extract at least one keyword based on the generated word graph. As the scheme of extracting the keyword from the word graph in the related art, a scheme of identifying a key node in the word graph through a centrality measure is primarily used. However, according to an embodiment of the present disclosure, a scheme of extracting a keyword node by using graph degeneracy may be utilized. The information on the dialogue input in the word graph may be expressed as a path between nodes. In this case, when the words overlap between the sentences of the dialogue, a cross path may be generated. When a new connection relationship may be generated between the nodes along the cross path, a path including a lot of information and having a shortened length may be generated. Accordingly, the graph degeneracy may be used in order to extract the keyword. There may be an effect of being capable of extracting the keyword without using the external system by using extracting the keyword node through the method.

When the graph degeneracy is used in order to extract the keyword node, a k-degeneracy word graph may be utilized. In this case, a word which belongs to k-core node of the graph may be regarded as the keyword. Further, as set of all keywords may be obtained by a set of the k-core nodes. As a result, according to an embodiment of the present disclosure, the computing device 100 may determine at least one k-core node and extract at least one keyword based on at least one node determined, in the word graph. Here, the k-core may mean a sub-graph maximally degenerated, which has an order of at least k or more (e.g., the number of nodes connected in the word graph).

Referring to FIG. 5, it can be seen that when nodes of which importance is low in the word graph, e.g., node P1 or P2 corresponding to 'I', node 'are', and node PUNCT are excluded, the number of nodes connected to a Poodles node 43 is uniquely the largest as '4'. That is, referring to FIG. 4, in the word graph of FIG. 5 for the dialogue 11, the Poodles node 43 may be determined as the k-core node and "Poodles" may be determined as a unique keyword of the dialogue 11.

According to an embodiment of the present disclosure, the computing device 100 may generate a plurality of candidate summary sentences based on the generated word graph. Since the words input into the generated word graph have an edge heading to the next word from the previous word, the computing device 100 may extract a plurality of paths connected to the node indicating the end of each sentence from the node indicating the start of each sentence in the word graph. Further, the plurality of candidate summary sentences may be generated based on the extracted paths. Additionally, the computing device 100 may apply a k-shortest path algorithm in extracting the plurality of paths in order to generate the plurality of candidate summary sentences. The k-shortest path algorithm as an algorithm for determining k shortest paths from one node to the other node on the word graph is, for example, a Dijkstra algorithm. When the number of all paths which are present in the word graph is smaller than k, all paths of the word graph may be determined as the shortest path. In the k-shortest path algorithm, the "shortest path" is not just determined according to the number of nodes, but determined based on a weight for the edge between the nodes. According to an embodiment of the present disclosure, the importance of the corresponding edge may be determined to be high as a lot of respective words of both nodes at both ends of the edge are included or the words of both nodes are jointly included in an original text. Specifically, when k candidate summary sentences are generated by using the k-shortest path algorithm, the following process may be performed.

1) A shortest path from the <BOS> node to the <EOS> node may be acquired by using the k-shortest path algorithm in the word graph.
2) The shortest path algorithm is repeatedly performed to acquire k paths.
3) When the shortest path algorithm is repeatedly performed, a set of the keywords corresponding to an entire keyword set is tracked, and as a result, all keywords of the entire keyword set may be discovered or path tracking may be terminated when a predetermined repetition number is reached.

For example, k candidate summary sentences corresponding to k shortest paths which start in the <BOS> node and ends at the <EOS) node may be generated, and a "summary sentence 45 corresponding to the shortest path passing through the Poodles node 43 which is the unique keyword" among k candidate summary sentences may be determined as a final summary sentence.

Accordingly, "These Poodles are very intelligent." which is the final summary sentence may be acquired, and the final summary sentence may express the summary for the dialogue 11.

The process of acquiring the candidate summary sentence based on the word graph generating process and the k-shortest path algorithm will be described in detail with reference to FIG. 5. Referring to FIG. 5, in the embodiment, the keyword is unique as "Poodles," but according to another embodiment, there may be a plurality of keywords corresponding to the k-core node. Hereinafter, a method for calculating the score associated with the keyword for each of the candidate summary sentences when there are the plurality of keywords will be described with reference to FIG. 6.

Figure 6:
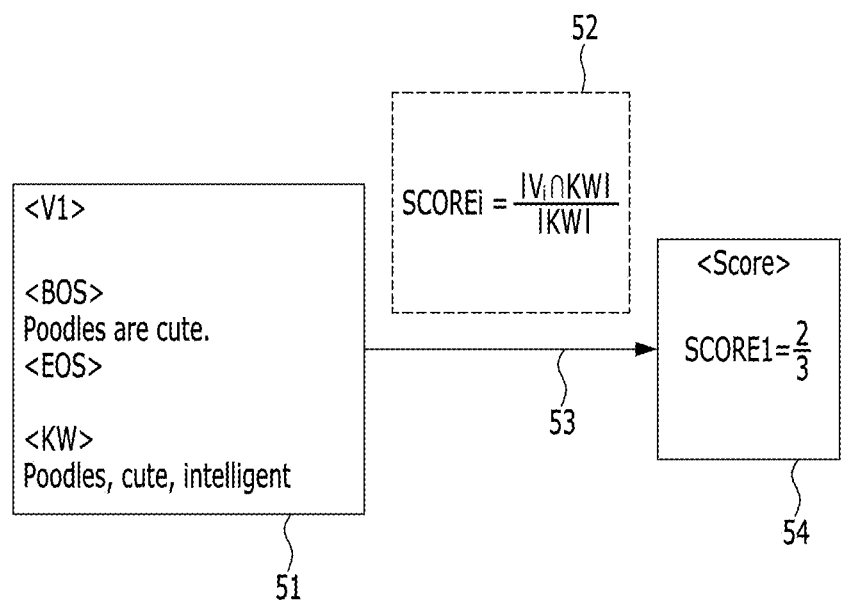
FIG. 6 is a flowchart illustrating a method for calculating a score associated with a keyword for a candidate summary sentence according to an embodiment of the present disclosure.

FIG. 6 is a flowchart illustrating a method for calculating a score associated with a keyword for a candidate summary sentence according to an embodiment of the present disclosure.

According to an embodiment of the present disclosure, the computing device 100 may extract the set of all keywords and calculate the score associated with the keyword for each of the plurality of generated candidate summary sentences. Further, the computing device 100 may select at least one of the plurality of candidate summary sentences based on the calculated score. A diversity compensation function is utilized for calculating a path score of the word graph in the related art, but the score of the present disclosure may be calculated by utilizing a function for measuring coverage instead of diversity. Further, a score for a specific candidate summary sentence may be calculated based on "the node set of all nodes which belongs to the path of the specific candidate summary sentence" and "the keyword set of all keywords related to the dialogue." Specifically, the score may be calculated based on "a size $|V_i \cap KW|$ of an intersection of the node set for the specific candidate summary sentence and the keyword set" and "a size $|KW|$ of the keyword set." For example, in an embodiment of the present disclosure, an equation 52 for the score calculated for the candidate summary sentence may be calculated as follows.

$$Score_i = \frac{|V_i \cap KW|}{|KW|} \qquad \text{[Equation 1]}$$

In Equation 52 above, Vi may mean a set of all nodes which belongs to sentence i (=path i) and KW may mean a set of all keywords, and the computing device 100 may calculate the score by the above equation for each candidate summary sentence, and select at least one candidate summary sentence among the plurality of candidate summary sentences based on the calculated score. Specifically, the computing device 100 may extract k candidate summary sentences by using the k-shortest path algorithm, and select the sentence having the highest score among the extracted candidate summary sentences. When there are two or more sentences having a highest score, two or more may be selected. Further, when k which is the number of candidate summary sentences increases, an execution speed of the process increases, but the accuracy of the summary may increase.

Referring to FIG. 6, an example of a candidate summary sentence 51 to calculate the score is disclosed. For example, the candidate summary sentence may be constituted by [<BOS>, Poodles, are, cute, <EOS>], and KW which is the entire keyword set may be constituted by [Poodles, cute, intelligent]. The computing device 100 may calculate the score for the candidate summary sentence 51 according to the disclosed equation 52 (53). The number of elements of the entire keyword set is 3, and the candidate summary sentence 51 includes two keywords, Poodles and cute among the keywords corresponding to the entire keyword set. Accordingly, the score 54 of the candidate summary sentence 51 may be calculated as ⅔.

Referring to FIG. 5, even in the case of the above-described embodiment, the score for the candidate summary sentence may be calculated based on the equation 52. Referring to FIG. 5, in the above-described embodiment, since the k-core node is just one as Poodles 43, the keyword is constituted by "Poodles" and the entire keyword set KW is constituted by [Poodles]. Since the summary sentence 45 ("These Poodles are very intelligent") which is one of k candidate summary sentences determined according to the k-shortest path algorithm includes the keyword "Poodles," the score according to the equation 52 may be calculated as 1/1. Since the remaining candidate summary sentences except for the summary sentence 45 among k candidate summary sentences do not include the keyword "Poodles," the score according to the equation 52 may be calculated as 0/1, and as a result, the summary sentence 45 having the highest score among k candidate summary sentences may be determined as the final summary sentence.

In the related art, an optimal path is determined according to whether the sentence being natural/whether various words being used by using an external language model, an external statistical model for the word, etc., for each sentence. According to the present disclosure, there may be a technical effect that the score is calculated according to a simple criterion indicating whether the keyword being included, and as a result, a scoring scheme is simple to improve a processing speed and improve an index such as ROUGE score for evaluating the summary.

Figure 7:
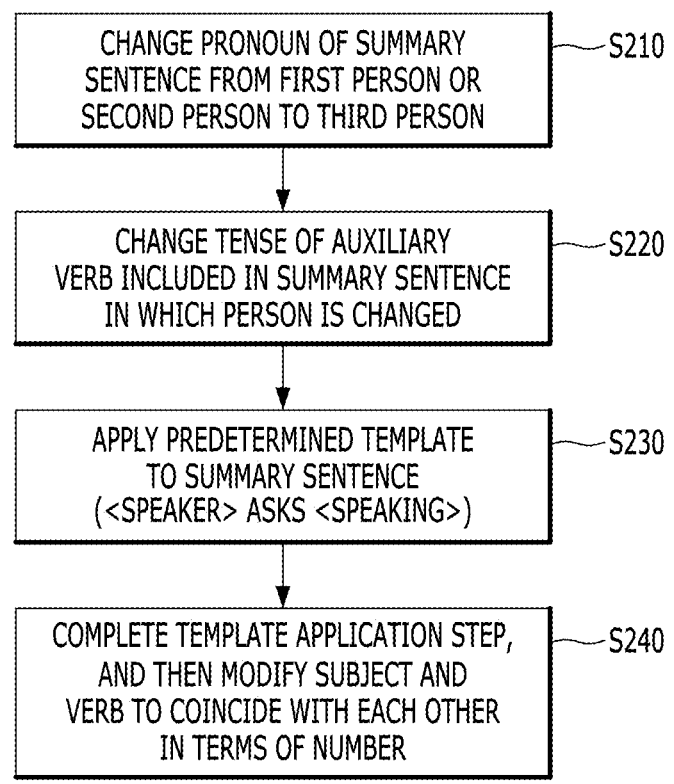
FIG. 7 is a flowchart illustrating a step of converting a grammatical person for a candidate summary sentence according to an embodiment of the present disclosure.

FIG. 7 is a flowchart illustrating a step of converting a grammatical person for a candidate summary sentence according to an embodiment of the present disclosure.

According to an embodiment of the present disclosure, the computing device 100 may convert a grammatical person for the one selected candidate summary sentence. Specifically, the computing device 100 may convert a first person or second person expression of at least one selected candidate summary sentence into a third person expression.

Referring to FIG. 7, grammatical person conversion for the candidate summary sentence is applied through four steps. First, a pronoun of the summary sentence may be changed from the first person or the second person to the third persons (S210). For example, the grammatical person of the dialogue may be converted by using a point of view (POV) conversion module based on a predetermined rule. The conversion module generates a pronoun suitable for each tone designated by using a decoder to set a condition to generate the sentence with a target style.

A tense of an auxiliary verb included in the sentence in which the grammatical person is changed through step S210 above may be changed (S220). For example, a case where when the dialogue is English, tenses of auxiliary verb can, may, and must are changed to could, might, and had to, respectively may be included.

Next, a predetermined template may be applied to the summary sentence (S230). For example, when the speaker of P1 speaks "I adopted two Poodles.," a template in which <speaker> asks <speaking> is predetermined, and the template is applied to the example sentence to acquire a sentence in which a grammatical person of "P1 adopted two Poodles." is converted.

Last, the computing device 100 may determine whether a subject and a verb coincide with each other in terms of a number in the sentence to which step S230 is applied, and then modify the subject and the verb to coincide with each other in terms of the number when the subject and the verb do not coincide with each other in terms of the number.

As such, the grammatical person conversion method has a technical effect that speaker information is directly used for a final summary to provide a summary into which a dialogue summary in which speaking of various persons is mixed is converted into a consistent third person, and grammatical person conversion may be performed in an internal summary process.

| Model | AMI | | | ICSI | | |
|---|---|---|---|---|---|---|
| | R1 | R2 | RL | R1 | R2 | RL |
| RepSum Fu et al. (2021) | 18.88 | 2.38 | 15.62 | — | — | — |
| Filippova (2010) | 33.47 | 6.21 | 15.15 | 26.53 | 3.69 | 12.09 |
| Mehdad et al. (2013) | 34.62 | 6.49 | 15.41 | 27.20 | 3.57 | 12.55 |
| Boudin and Morin (2013) | 34.21 | 6.37 | 14.92 | 26.90 | 3.64 | 12.18 |
| Shang et al. (2018) | 34.34 | 6.13 | 15.58 | 26.93 | 3.65 | 12.68 |
| Filippova (2010) $_{+POV}$ | 34.16 | 6.35 | 15.27 | 26.79 | 3.81 | 12.21 |
| Mehdad et al. (2013) $_{+POV}$ | 35.39 | 6.59 | 15.54 | 27.48 | 3.65 | 12.66 |
| Boudin and Morin (2013) $_{+POV}$ | 34.93 | 6.49 | 15.07 | 27.14 | 3.72 | 12.20 |
| Shang et al. (2018) $_{+POV}$ | 34.91 | 6.18 | 15.70 | 27.27 | 3.72 | 12.78 |
| Ours $_{PreSeg}$ | 32.21 | 5.55 | 14.85 | 27.60 | 4.43 | 11.66 |
| Ours $_{TopicSeg}$ | 33.30 | 6.59 | 14.19 | 27.66 | 4.27 | 12.16 |
| Ours $_{PreSeg+POV}$ | 33.66 | 6.85 | 14.17 | 27.80 | 4.56 | 11.77 |
| Ours $_{TopicSeg+POV}$ | 33.21 | 5.84 | 15.30 | 27.84 | 4.33 | 12.29 |

<ROUGE score comparison table in case of additionally applying person conversion with existing summary model>

Additionally, referring to the table, it can be seen that the person conversion method is used to acquire an effect that a ROUGE score index improve which is an evaluation index of the summary by comparing with a summary in which the person conversion is not made.

Figure 8:
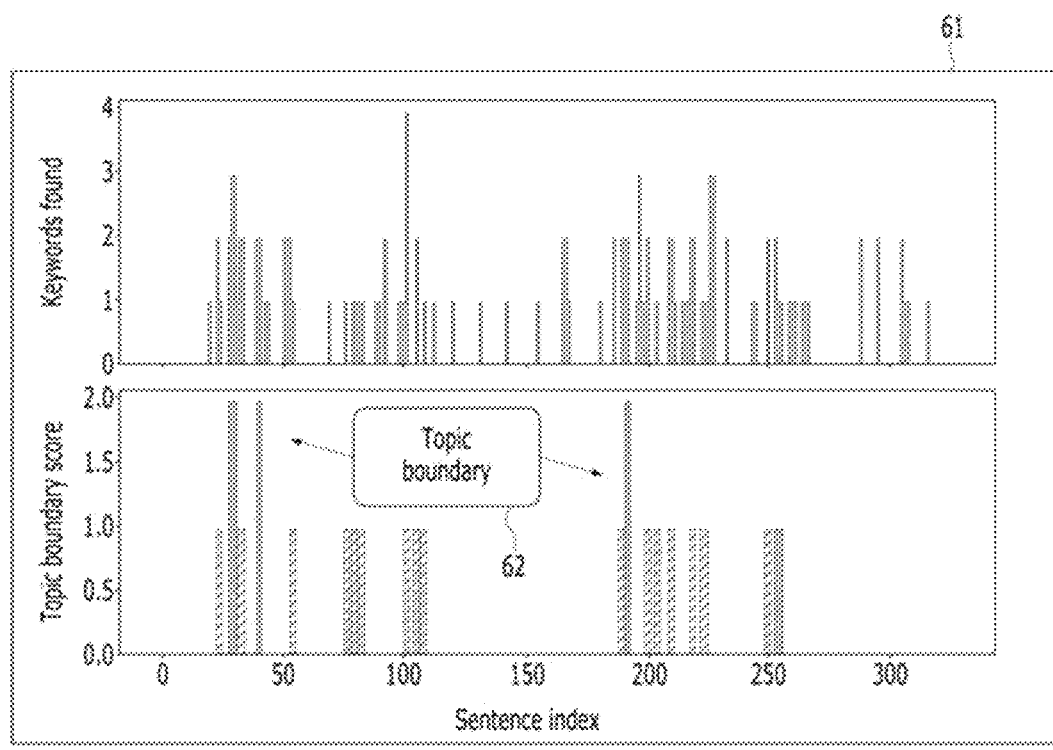
FIG. 8 is a schematic view illustrating a process used for dividing word graphs and generating a plurality of word sub-graphs according to an embodiment of the present disclosure.

FIG. 8 is a schematic view illustrating a process used for dividing word graphs and generating a plurality of word sub-graphs according to an embodiment of the present disclosure.

According to an embodiment of the present disclosure, when the computing device 100 generates a plurality of candidate summary sentences in step S130, the computing device 100 may generate a plurality of word sub-graphs by segmenting the word graph, and generate a plurality of candidate sub-summary sentences for each of the plurality of word sub-graphs. Further, the computing device 100 may generate the summary of the dialogue based on the plurality of candidate sub-summary sentences for the plurality of word sub-graphs, respectively.

For example, the computing device 100 may generate (1) a plurality of word sub-graphs (G-sub1, G-sub2, G-subN) for a plurality of partial dialogues by segmenting a word graph G for an entire dialogue and (2) generate a plurality of candidate sub-summary sentences (e.g., G-sub1-candidate1, G-sub1-candidate2, G-sub1-candidateK) for the respective word sub-graphs (e.g., G-sub1). Further, the computing device 100 may (3) extract at least one keyword (e.g., G-sub1-keyword) for each word sub-graph (e.g., G-sub1), and then calculate scores the plurality of candidate sub-summary sentences (e.g., G-sub1-candidate1, G-sub1-candidate2, G-sub1-candidateK) of the respective word sub-graphs (e.g., G-sub1), and (4) select a final sub-summary sentence (e.g., G-sub1-final summary) for each word sub-graph (e.g., G-sub1) based on the calculated scores. Further, the computing device 100 may (5) generate the summary information for the entire dialogue based on a plurality of final sub-summary sentences (G-sub1-final summary, G-sub2-final summary, . . . , G-subN-final summary) for the plurality of word sub-graphs (G-sub1, G-sub2, G-subN) selected by such a scheme.

In particular, the computing device 100 may apply the additional process when the received summary target dialogue is long.

When the computing device 100 generates the plurality of sub-graphs by segmenting the word graph, the computing device 100 may generate a vector representing whether each sentence includes at least one keyword for each of the sentences included in the word graph, and generate the plurality of word sub-graphs based on a distance or a similarity between the generated vectors.

For example, the computing device 100 may determine a criterion for segmenting the word graph by referring to a graph 61 of FIG. 8 in the process of segmenting the word graph into the plurality of word sub-graphs. First, the computing device 100 may represent whether each sentence of the input dialogue includes the keyword by a topic vector. For example, when a keyword list of the entire input dialogue is [John, pizza], a length of the topic vector for each sentence may become 2 which is the number of keywords. A first index of the vector may represent whether the sentence includes "John" and a second index may represent whether the sentence includes "pizza". If sentence 1 is "Hello, john" and sentence 2 is "Did you eat pizza?," the topic vector of sentence 1 may be expressed as [1,0] and the topic vector of sentence 2 may be expressed as [0,1]. In this case, a distance between the topic vectors may be digitized as d, and as a result, a topic distance between the sentences may be measured. The following equation may be exemplarily utilized for measuring the distance d.

$$\text{Distance between topic } vectors_{i,i+1} = -\left( \frac{\text{topic } vector_i \cdot \text{topic } vector_{i+1}}{\|\text{topic } vector_i\| \|\text{topic } vector_{i+1}\|} \right) \quad \text{[Equation 2]}$$

In Equation 2 above, a distance between topic vector i and topic vector i+1 is expressed by using a negative cosine similarity. When a boundary of word graph segmentation is referred to as a topic boundary 62, the computing device 100 measures each distance between the topic vectors to determine the topic boundary 62 within a farthest distance. When P is a hyperparameter representing the total number of topics, the computing device 100 segments the word graph into P−1 or less topic boundaries within the topic boundary to generate the plurality of word sub-graphs. In this case, the keyword nodes which are all intersections between the sentences may become a latent topic boundary 62. The computing device 100 generates the word sub-graphs and generates the respective sub-candidate summary sentences when necessary to perform the summary for a long text. Further, according to the present disclosure, a method for segmenting the word graph itself is presented to acquire a technical object of being capable of conducting the summary by segmenting the text without an external topic segmentation system.

Disclosed is a computer readable medium storing the data structure according to an embodiment of the present disclosure. The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning. Hereinafter, the computation model, the neural network, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 9:
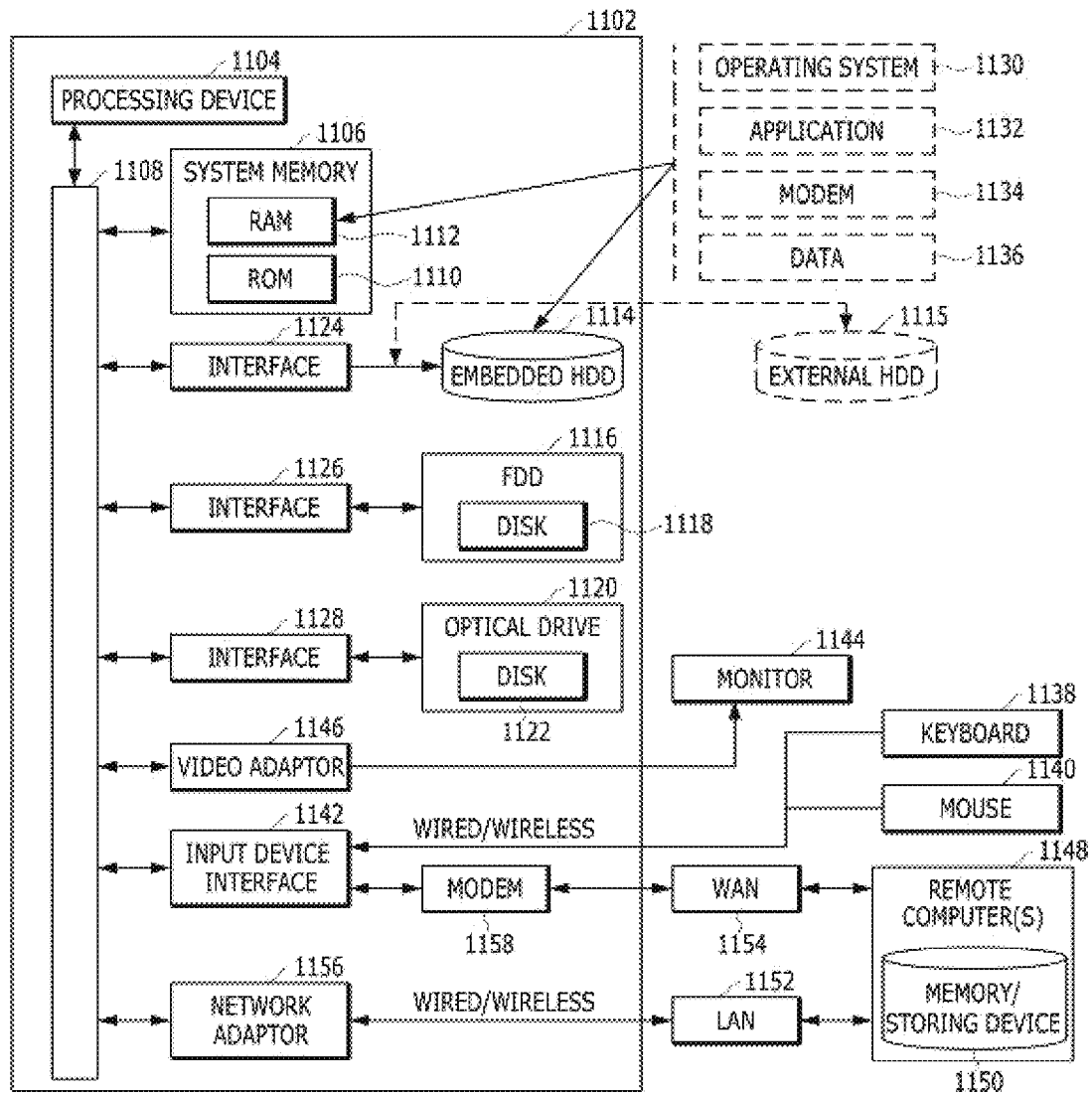
FIG. 9 is a normal and schematic view of a computing environment in which the embodiments of the present disclosure may be implemented.

FIG. 9 is a normal and schematic view of a computing environment in which the embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for dialogue summarization performed by a computing device, the method comprising:
   generating a word graph based on information on a dialogue, wherein the dialogue is a summary target;
   extracting at least one keyword based on the generated word graph;
   generating a plurality of candidate summary sentences based on the generated word graph; and
   calculating a score associated with at least one keyword for each of the plurality of candidate summary sentences, and selecting at least one of the plurality of candidate summary sentences based on the calculated score,
   wherein the score is calculated for each of the plurality of candidate summary sentences,
   wherein a score for a specific candidate summary sentence is calculated based on a node set of all nodes which belongs to a path of the specific candidate summary sentence and a keyword set of all keywords related to the dialogue,
   wherein the generating of the word graph includes:
      segmenting the information on the dialogue by the unit of a token;
      adding an additional token indicating a start and an end to a front and a rear of each sentence; and
      adding each token to a node according to an order,
   wherein the generating of the plurality of candidate summary sentences based on the generated word graph includes:
      extracting a plurality of paths connected to the node indicating the end of each sentence from the node indicating the start of each sentence from the word graph; and
      generating the plurality of candidate summary sentences based on the plurality of extracted paths,
   wherein the generating of the plurality of candidate summary sentences based on the plurality of extracted paths includes:
      generating the plurality of candidate summary sentences by applying a k-shortest path algorithm to the plurality of extracted paths.

2. The method of claim 1, wherein the extracting of at least one keyword based on the generated word graph includes:
   determining at least one k-core node in the word graph; and
   extracting at least one keyword based on at least one determined k-core node.

3. The method of claim 1, wherein the score for the specific candidate summary sentence is calculated based on a size of an intersection of the node set for the specific candidate summary sentence and the keyword set, and a size of the keyword set.

4. The method of claim 1, further comprising:
   converting a grammatical person for at least one selected candidate summary sentence.

5. The method of claim 4, wherein the converting of the grammatical person for at least one selected candidate summary sentence includes:
   converting a first person or second persons expression of at least one selected candidate summary sentence into a third person expression.

6. The method of claim 1, wherein the generating of the plurality of candidate summary sentences based on the generated word graph includes:
   generating a plurality of word sub-graphs by segmenting the word graph; and
   generating a plurality of candidate sub-summary sentences for each of the plurality of word sub-graphs.

7. The method of claim 6, wherein the generating of the plurality of word sub-graphs by segmenting the word graph includes:
   generating a vector representing whether each sentence includes at least one keyword for each of the sentences included in the word graph; and
   generating the plurality of word sub-graphs based on a distance or a similarity between the generated vectors.

8. A computer program stored in a non-transitory computer-readable storage medium, wherein the computer program allows one or more processors to perform operations for generating dialogue summarization when the computer program is executed by the one or more processors, the operations comprising:
   generating a word graph based on information on a dialogue, wherein the dialogue is a summary target;

extracting at least one keyword based on the generated word graph;
generating a plurality of candidate summary sentences based on the generated word graph; and
calculating a score associated with at least one keyword for each of the plurality of candidate summary sentences, and selecting at least one of the plurality of candidate summary sentences based on the calculated score,
wherein the score is calculated for each of the plurality of candidate summary sentences,
wherein a score for a specific candidate summary sentence is calculated based on a node set of all nodes which belongs to a path of the specific candidate summary sentence and a keyword set of all keywords related to the dialogue,
wherein the generating of the word graph includes:
  segmenting the information on the dialogue by the unit of a token;
  adding an additional token indicating a start and an end to a front and a rear of each sentence; and
  adding each token to a node according to an order,
wherein the generating of the plurality of candidate summary sentences based on the generated word graph includes:
  extracting a plurality of paths connected to the node indicating the end of each sentence from the node indicating the start of each sentence from the word graph; and
  generating the plurality of candidate summary sentences based on the plurality of extracted paths,
wherein the generating of the plurality of candidate summary sentences based on the plurality of extracted paths includes:
generating the plurality of candidate summary sentences by applying a k-shortest path algorithm to the plurality of extracted paths.

9. A computing device comprising:
at least one processor; and
a memory, wherein the at least one processor is configured to:
  generate a word graph based on information on a dialogue, wherein the dialogue is a summary target,
extract at least one keyword based on the generated word graph and generate a plurality of candidate summary sentences based on the generated word graph, and
calculate a score associated with at least one keyword for each of the plurality of candidate summary sentences, and select at least one of the plurality of candidate summary sentences based on the calculated score,
wherein the score is calculated for each of the plurality of candidate summary sentences,
wherein a score for a specific candidate summary sentence is calculated based on a node set of all nodes which belongs to a path of the specific candidate summary sentence and a keyword set of all keywords related to the dialogue,
wherein the generating of the word graph includes:
  segmenting the information on the dialogue by the unit of a token;
  adding an additional token indicating a start and an end to a front and a rear of each sentence; and
  adding each token to a node according to an order,
wherein the generating of the plurality of candidate summary sentences based on the generated word graph includes:
extracting a plurality of paths connected to the node indicating the end of each sentence from the node indicating the start of each sentence from the word graph; and
generating the plurality of candidate summary sentences based on the plurality of extracted paths,
wherein the generating of the plurality of candidate summary sentences based on the plurality of extracted paths includes:
generating the plurality of candidate summary sentences by applying a k-shortest path algorithm to the plurality of extracted paths.

* * * * *